(12) United States Patent
Ukita

(10) Patent No.: US 6,310,668 B1
(45) Date of Patent: Oct. 30, 2001

(54) LCD WHEREIN OPENING IN SOURCE ELECTRODE OVERLAPS GATE ELECTRODE TO COMPENSATE VARIATIONS IN PARASITIC CAPACITANCE

(75) Inventor: Tooru Ukita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/329,559

(22) Filed: Jun. 10, 1999

(30) Foreign Application Priority Data

Jun. 10, 1998 (JP) .................................. 10-162691

(51) Int. Cl.$^7$ ...................................... G02F 1/136
(52) U.S. Cl. ............................................. 349/42
(58) Field of Search ........................... 349/42, 43, 46, 349/139, 39

(56) References Cited

U.S. PATENT DOCUMENTS 5,302,987 * 4/1994 Kanemori et al. ............... 359/58
5,818,549 * 10/1998 Maruyama et al. .............. 349/42

FOREIGN PATENT DOCUMENTS

| | | |
|---|---|---|
| 61-166587 | 7/1986 | (JP) . |
| 62-95865 | 5/1987 | (JP) . |
| 2-51128 | 2/1990 | (JP) . |
| 4-3124 | 1/1992 | (JP) . |
| 4-68319 | 3/1992 | (JP) . |
| 6-110081 | 4/1994 | (JP) . |

* cited by examiner

*Primary Examiner*—James A. Dudek
*Assistant Examiner*—Andrew Schechter
(74) *Attorney, Agent, or Firm*—Scully, Scott, Murphy & Presser

(57) ABSTRACT

In a liquid crystal display device, a TFT is formed on a first transparent insulation substrate and includes: a semiconductor layer formed adjacent to a gate insulation film; a drain and a source electrode both formed in opposite ends of the semiconductor layer; and, a gate electrode formed in the gate insulation film so as to be disposed in a partially overlapping relationship with both the drain and the source electrode. The source electrode has a source notch portion which satisfies a predetermined equation to compensate for variations in parasitic capacitance appearing between the source and the gate electrode. The device prevents both its responsivity and its aperture ratio from deteriorating and also prevents its leakage current from increasing. The device is free from any possible restrictions caused by a specific construction of the TFT used in the device.

21 Claims, 10 Drawing Sheets

11; source notch portion

4; gate notch portion

4 ;gate notch portion

26;source notch portion

US 6,310,668 B1

LCD WHEREIN OPENING IN SOURCE ELECTRODE OVERLAPS GATE ELECTRODE TO COMPENSATE VARIATIONS IN PARASITIC CAPACITANCE

BACKGROUND OF THE INVENTION

1. Field of the Invention

The present invention relates to a liquid crystal display device, and more particular to a liquid crystal display device of an active matrix type, which uses a TFT (i.e., Thin Film Transistor) as a switching element of the device.

2. Description of the Related Art

In general, the liquid crystal display device is advantageous in that reduction of the device is possible in its thickness, weight and also in its power consumption. Consequently, in recent years, the liquid crystal display device is extensively used in information equipment, AV (i.e., Audio Visual) equipment and like equipment. Of these liquid crystal display devices, particularly, the liquid crystal display device of the active matrix type has a construction in which a plurality of pixels are driven by their corresponding switching elements. Further, of these active matrix type liquid crystal display devices, particularly, one using the TFT as its switching element is in principle not dependent upon the number of scanning cycles in sharpening an image being displayed. In addition to such sharp contrast, the active matrix type of liquid crystal display device having the TFT is advantageous in a high speed display mode. Consequently, the active matrix type of liquid crystal display device is advantageously used in large display screens and also in high definition motion display units.

Conventionally, the TFT has been produced so as to have a reversed stagger construction, in which a channel region is formed over a gate electrode by applying both a thin-film forming technology and a lithography technology in a transparent insulation substrate made of glass and like materials.

FIGS. 9 and 10 show in construction a plan view and a cross-sectional view of one of pixels of the conventional active matrix type of liquid crystal display device, respectively, wherein: the cross-sectional view is taken along the line C—C of FIG. 9; and, the active matrix type of liquid crystal display device is provided with the TFT having such reversed stagger construction, and is hereinafter referred to simply as the liquid crystal display device.

In a construction shown as in FIGS. 9 and 10: a gate electrode 32 is formed on a transparent insulation substrate 31; connected with this gate electrode 32 is a gate bus wiring 33; the gate electrode 32 is covered with a gate insulation film 35; a semiconductor layer 36 assuming a longitudinally elongated shape is formed in a portion of the gate insulation film 35; and, each of a drain electrode 39 and a source electrode 40 is formed in each of opposite ends of this semiconductor layer 36 through a contact layer 37. Formed in the source electrode 40 is a transparent pixel electrode 42. Extending from the drain electrode 39 is a drain bus wiring 38 which extends in a direction substantially perpendicular to a longitudinal direction of the gate bus wiring 33. Formed under the transparent pixel electrode 42 are an auxiliary capacitance wiring 44 and an auxiliary capacitance electrode 45.

A TFT 50 having the reversed stagger construction is constructed of: the gate electrode 32; a semiconductor layer 36; a contact layer 37; a drain electrode 39; and, the source electrode 40. In the TFT 50, a channel region formed on a surface of the semiconductor layer 36 disposed over the gate electrode 32 is placed under the control of the gate electrode 32. Further, all the semiconductor layer 36, drain electrode 39, source electrode 40 and the transparent pixel electrode 42 are covered with a protective film 43.

On the other hand, a transparent insulation substrate 51 corresponding to the transparent insulation substrate 31 is formed. A portion of this transparent insulation substrate 51 is formed into a colored layer 52. Further, a light shield layer 53 is formed in a position corresponding to that of the TFT 50. A transparent common electrode 54 is so formed as to cover both the light shield layer 53 and the colored layer 52.

In the above construction, a liquid crystal layer 55 is sealed in between: the transparent insulation substrate 31 on which the TFT 50 is formed; and, the transparent insulation substrate 51 formed over the transparent common electrode 54, so that the conventional liquid crystal display device is formed.

In the conventional liquid crystal display device having the above construction, the gate bus wiring 33 is connected with scan lines (not shown) through which scanning signals are applied to the gate bus wiring 33. On the other hand, connected with the drain bus wiring 38 are signal lines (not shown), to which video signals are applied to operate the liquid crystal display device.

Next, a method for driving the conventional liquid crystal display device will be described.

FIG. 7 shows a circuit equivalent in function to one of pixels of the above conventional liquid crystal display device, in which: the reference character $C_{GS}$ denotes a parasitic capacitance between the gate electrode 32 and the source electrode 40; the reference character $C_{LC}$ denotes a capacitance of the liquid crystal; and, the reference character $C_{SC}$ denotes a holding capacitance.

Further, FIG. 8 shows timing charts of various electric signals in the drive mode of the conventional liquid crystal display device.

In operation, in a condition in which a predetermined signal voltage $V_D$ is applied to the source electrode 40 from the signal lines, a fist row of the matrix is scanned at first, so that a gate voltage $V_{GON}$ serving as a selecting signal is applied to the gate electrode 32 through the gate bus wiring 33, whereby all the TFTs of the pixels connected with the first row of the matrix are turned ON, which causes a potential level V of the transparent pixel electrode 42 of each of the TFTs 50 to be equal to the signal voltage $V_D$.

Next, when a second row is scanned, the gate voltage of the gate electrode 32 of each of the first row's pixels decreases to a voltage of $V_{GOFF}$, which turns OFF the TFTs 50 of the first row's pixels. However, since each of the TFTs 50 functions as a memory element because of the presence of: the parasitic capacitance $C_{GS}$ between the gate and the source electrode; a liquid crystal capacitance $C_{LC}$ and the holding capacitance $C_{SC}$, the above-mentioned potential level $V_{P1}$ of the transparent pixel electrode 42 of each of the TFTs 50 remains at the same potential level as that $V_D$ of the signal line. Consequently, the liquid crystal 55 has its molecules vary in their orientation on the basis of such potential level $V_{P1}$. As a result, due to rotary polarization of the liquid crystal, each of the pixels of the display unit is modified in its transmission light, which enables to display an image on the display unit as a whole.

On the other hand, the potential level $V_{P1}$ of the transparent pixel electrode 42 is held at the same potential level as that of the signal potential level $V_D$, but actually the potential level $V_{P1}$ of the transparent pixel electrode 42 reduces from the potential level $V_D$ by the amount of a potential of $\Delta V$ under the influence of the presence of: the parasitic capacitance $C_{GS}$; liquid crystal capacitance $C_{GL}$ and the holding capacitance $C_{SC}$ at a time when the TFT 50 is turned OFF, i.e., when the gate voltage is reduced from a voltage of $V_{GON}$ to a voltage of $V_{GOFF}$. In the above, the potential of $\Delta V$ is called the feed-through voltage which is given by the following equation (1):

$$\Delta V = \Delta V_G (C_{GS}/(C_{GS}+C_{LC}+C_{SC})) \quad (1)$$

Where: $\Delta V_G = (V_{GON} - V_{GOFF})$

As is clear from the above equation (1), the feed-through voltage $\Delta V$ is proportional to the parasitic capacitance $C_{GS}$ between the gate and the source electrode. Consequently, it is preferable to reduce the parasitic capacitance $C_{GS}$.

Here, as shown in FIG. 8, with respect to the signal potential level $V_D$ which is applied from the signal line to the drain electrode 39 through the drain bus wiring 38, an AC current having its polarity reversed at every frame of a picture to be scanned is used in order to prevent the liquid crystal layer 55 from suffering from any burning problem. Consequently, the transparent pixel electrode 42 also has its potential $V_{P1}$ reversed in polarity. In this case, however, as described above, since its potential level $V_{P1}$ described above reduces from the potential level $V_D$ by the amount of a potential of $\Delta V$, it is necessary to set a potential level $V_{COM}$ of the transparent common electrode 54 of the side of the transparent insulation substrate 51 so as to be smaller than a central potential level of $V_c$ by the potential of $\Delta V$ (i.e., $V_{COM} = V_C - \Delta V$).

As a result, as shown in FIG. 8 in hatched area, a potential or voltage applied to the liquid crystal layer 55 assumes a waveform which is symmetric with respect to a neutral line extending horizontally between a positive and a negative area of the timing chart shown in FIG. 8. When a potential or voltage applied to the liquid crystal layer 55 does not assume such a symmetric waveform, this results in a so-called flicker phenomenon or problem causing an image on a screen of the display unit to flicker. In this case, in addition to such flicker phenomenon or problem, there is another advantageous phenomenon, i.e., burning phenomenon of a screen in the display unit since the screen is continuously subjected to a DC current caused by an asymmetric component of the voltage or potential having been applied to the liquid crystal layer 55.

On the other hand, fabrication of the TFTs 50 onto the transparent insulation substrate 31 is realized by combination of: a thin film deposition technology represented by, for example such as sputtering processes, CVD (i.e., Chemical Vapor Deposition) processes and like processes; and, a photolithography technology. Namely, in the above fabrication, it is necessary to repeat mask alignment operations of a plurality of masks having various patterns so as to repeatedly perform patterning operations of both the insulation films and the conductive films of the device. In this case, however, due to the presence of limits in an accuracy of mechanical positioning operations, some misalignment inevitably occurs in the mask alignment operations.

Consequently, in fabrication of each of the TFTs 50, particularly, in fabrication of the gate electrode 32 and the source electrode 40, the above-mentioned misalignment causes a hatched area of FIG. 9 to vary in area size, provided that: through such hatched area of FIG. 9, the gate electrode 32 and the source electrode 40 are disposed in an overlapping relationship with each other. Due to this, the parasitic capacitance $C_{GS}$ between the gate and the source electrode varies. Consequently, as is clear from the above equation (1), the feed-through voltage or potential of $\Delta V$ varies. This permits the flicker phenomenon, burning phenomenon and like disadvantageous phenomena or problems to take place. In order to prevent these disadvantageous phenomena or problems from taking place, it is necessary to individually control the potential level $V_{COM}$ of the transparent common electrode 54.

Here, in order to reduce the amount of misalignment in the mask alignment operation, there is one of conventional ideas that a mask is divided into a plurality of small mask areas, for example, into a pair of small mask areas A and B in use. However, in this case, there is a possibility that the small mask area A differs from the small mask area B in the amount of misalignment. In this case, with respect to an optimum value of the potential level $V_{COM}$ of the transparent common electrode 54, these small mask areas A and B differs from each other, which makes it impossible to have one of these small mask areas A and B be free from the flicker phenomenon and like disadvantageous phenomena. This is another problem inherent in the prior art.

The following Japanese Laid-Open Patent Application No. Hei06-110081 (hereinafter referred to as the first conventional sample) discloses a conventional liquid crystal display device which compensates for variations in parasitic capacitance $C_{GS}$ which appears between the gate and the source electrode of the TFT due to the presence of misalignment in mask alignment operations.

FIG. 11 shows a plan view of the conventional liquid crystal display device disclosed in the first conventional sample, in which: each of a gate electrode 32 and a compensating gate electrode 61 is so arranged as to extend in a direction perpendicular to a longitudinal direction of a gate bus wiring 33; and, a compensating source electrode 62 is disposed over both the source electrode 40 and the compensating gate electrode 61 in a partially overlapping relationship therewith. Incidentally, in FIGS. 9 and 10, the parts which are the same as ones in FIG. 11 have been given the same reference numerals, and, therefore are not further explained hereinafter.

In the construction as shown in FIG. 11, even when a gate pattern and a source pattern are vertically or horizontally misaligned in a mask alignment process, it is possible to keep the parasitic capacitance $C_{GS}$ appearing between the gate and the source electrode at a constant value, because the sum in area size of: a left-hand hatched area of the Figure through which the source electrode 40 is disposed in an overlapping relationship with the gate electrode 32; and, a right-hand hatched area of the Figure through which the compensating source electrode 62 is disposed in an overlapping relationship with the compensating gate electrode 61 does not vary.

FIG. 13 shows a plan view of a liquid crystal display device disclosed in Japanese Laid-Open Patent Application No. Hei04-68319 (hereinafter referred to as the second conventional sample), in which: a gate electrode 32 disposed substantially perpendicular to a gate bus wiring 33 is extended to form: a compensating gate electrode 65 in its front end portion; and, a compensating source electrode 66 which is formed so as to be turned towards the left side portion of the compensating gate electrode 65, and thereby partially overlapping with the compensating gate electrode 65.

In the construction as shown in FIG. 13 described above, even when a gate pattern and a source pattern are vertically or horizontally misaligned in a mask alignment process, it is possible to keep the parasitic capacitance $C_{GS}$ appearing between the gate and the source electrode at a constant value, because the sum in area size of: an upper hatched area of the Figure through which the source electrode 40 is disposed in an overlapping relationship with the gate electrode 32; and, a lower hatched area of the Figure through which the compensating source electrode 66 is disposed in an overlapping relationship with the compensating gate electrode 65 does not vary.

FIG. 14 shows a plan view of a liquid crystal display device disclosed in Japanese Laid-Open Patent Application No. Hei 04-3124 (hereinafter referred to as the third conventional sample), in which: a pair of gate electrodes 32 and 34 are disposed substantially perpendicular to a gate bus wiring 33; a drain electrode 39 is disposed between the gate electrodes 32 and 34 in a partially overlapping relationship with these gate electrodes 32 and 34; and, a pair of source electrodes 40 and 41 are disposed outside the gate electrodes 32 and 34 in a partially overlapping relationship with these gate electrodes 32 and 34, respectively.

Here, it is necessary to form a pair of semiconductor layers 36 and 46 corresponding to the pair of the gate electrodes 32 and 34, respectively. Consequently, in this third conventional sample, with respect to each of the pixels, a pair of TFTs are formed.

In the above construction as shown in FIG. 14, even when a gate pattern and a source pattern are vertically or horizontally misaligned in a mask alignment process, it is possible to keep the parasitic capacitance $C_{GS}$ appearing between the gate and the source electrode at a constant value, because the sum in area size of: a left-hand hatched area of the Figure through which the source electrode 40 is disposed in an overlapping relationship with the gate electrode 32; and, a right-hand hatched area of the Figure through which the source electrode 41 is disposed in an overlapping relationship with gate electrode 34 does not vary.

FIG. 15 shows a plan view of a conventional liquid crystal display device disclosed in Japanese Laid-Open Patent Application No. Sho62-95865 (hereinafter referred to as the fourth conventional sample), in which: a semiconductor layer 36 is formed so as to assume a longitudinally elongated shape; and, a gate electrode 32 is formed over the semiconductor layer 36 so as to be disposed substantially perpendicular to a drain bus wiring 38. The gate electrode 32 is constructed of: a first electrode 55 partially overlapping with an upper portion of a gate bus wiring 33; and, a second electrode 56 partially overlapping with a lower portion of the gate bus wiring 33.

Further provided in the fourth conventional sample are a pair of source electrodes 47 and 48, wherein: the source electrode 47 is oppositely disposed from the first electrode 55 so as to partially overlap with a lower portion of the gate bus wiring 33; and, the source electrode 48 is oppositely disposed from the second electrode 56 so as to partially overlap with an upper portion of the gate bus wiring 33. Consequently, a pair of TFTs are formed with respect to each of the pixels.

In the construction as shown in FIG. 15 described above, even when a gate pattern and a source pattern are vertically or horizontally misaligned in a mask alignment process, it is possible to keep the parasitic capacitance $C_{GS}$ appearing between the gate and the source electrode at a constant value, because the sum in area size of: a left-hand hatched area shown in the Figure through which the source electrode 47 is disposed in an overlapping relationship with the first electrode 55 of the gate electrode 32; and, a right-hand hatched area of the Figure through which the source electrode 48 is disposed in an overlapping relationship with the second electrode 56 of the gate electrode 32 does not vary.

FIG. 16 shows a plan view of a conventional liquid crystal display device disclosed in Japanese Laid-Open Patent Application No. Sho61-166587 (hereinafter referred to as the fifth conventional sample), in which: a gate electrode 32 formed substantially perpendicular to a gate bus wiring 33 has its portion bent so as to extend in a direction parallel to a longitudinal direction of the gate bus wiring 33; a semiconductor layer 36 is formed so as to cover both the gate bus wiring 33 and the gate electrode 32; and, a source electrode 40 is disposed so as to partially overlap with the portion of the gate electrode 32, which portion is parallel with the gate bus wiring 33.

In the construction shown in FIG. 16 described above, even when a gate pattern and a source pattern are vertically or horizontally misaligned in a mask alignment process, it is possible to keep the parasitic capacitance $C_{GS}$ appearing between the gate and the source electrode at a constant value, because the total area size of a hatched portion shown in FIG. 16, through which hatched portion the source electrode 40 is disposed in an overlapping relationship with the gate electrode 32 does not vary.

However, any of the liquid crystal display devices disclosed in the first to the fifth conventional samples fails to compensate for the variations in parasitic capacitance appearing between the gate and the source electrode, i.e., suffers from the following problems in compensating for such variations in parasitic capacitance, namely:

A first one of the problems inherent in the conventional devices is as follows: in the conventional device, it is necessary to additionally form a compensating pattern means serving as a gate electrode or a source electrode. Consequently, the conventional device increases in volume corresponding to such compensating pattern means, which increases a load of a drive circuit of the conventional device, and thereby impairing the device in responsivity.

A second one of the problems inherent in the conventional devices is as follows: when the compensating pattern means is additionally formed in the device, such formation of the compensating pattern means also impairs the device in its aperture ratio (i.e., a ratio of effective display area to pixel's unit area). For example, in the case of the first conventional sample shown in FIG. 11, this first conventional sample is inferior to another conventional liquid crystal display device of FIG. 12 in its aperture ratio, because both the compensating gate electrode 61 and the compensating source electrode 62 formed in the first conventional sample shown in FIG. 11 are not formed in another conventional liquid crystal display device of FIG. 12.

A third one of the problems inherent in the conventional devices is as follows: since the conventional device fails to sufficiently shield its peripheral portion from the light, its leakage current increases when the TFTs of the device are turned OFF, which brings forth poor contrast in display. In other words, as shown in FIG. 10, when the light is incident on the device in a direction of the arrow from the side of a transparent insulation substrate 31 which is not provided with any light shield layer in its side, this incident light is then reflected from a light shield layer 53 provided in the side of a transparent insulation substrate 51. After that, the thus reflected light reaches a semiconductor layer 36, which causes the leakage current to increase as is in each of the remaining conventional devices.

Further, in any device of the first to the third conventional samples, since the semiconductor layer is formed into a longitudinally elongated shape over an upper portion of the gate electrode which is branched off from the gate bus wiring so as to be substantially perpendicular to the gate bus wiring, the TFT is limited in construction to a longitudinally arranged type construction. Due to this, it is impossible for any one of the conventional devices to employ a TFT having a horizontally arranged type construction in which the semiconductor layer is formed into a horizontally elongated shape. This is another disadvantage inherent in the conventional device. In general, the TFT having a longitudinally arranged type construction is inferior in aperture ratio to the TFT having a horizontally arranged type construction due to the presence of its branched-off gate electrode.

SUMMARY OF THE INVENTION

It is therefore an object of the present invention to provide a liquid crystal display device which is capable of: improving both its responsivity and its aperture ratio; preventing the leakage current from increasing; and, compensating for the variations in parasitic capacitance appearing between a gate and a source electrode.

According to with a first aspect of the present invention, there is provided a liquid crystal display device comprising: a first transparent insulation substrate on which a plurality of thin film transistors are formed; a second transparent insulation substrate; and, a liquid crystal layer sealed in a space between the first and the second transparent insulation substrate, wherein each of the thin film transistors is provided with: a semiconductor layer formed adjacent to a gate insulation film; a drain and a source electrode both formed in opposite ends of the semiconductor layer; and, a gate electrode formed in the gate insulation film so as to be disposed in a partially overlapping relationship with both the drain and the source electrode, the improvement wherein:

the source electrode is provided with a notch portion which is disposed in a partially overlapping relationship with the gate electrode.

In the foregoing, a preferable mode is one wherein the notch portion assumes a rectangular shape having a predetermined length;

a ratio in length of the predetermined length of the rectangular shape of the notch portion in the source electrode to a width of the source electrode is substantially equal to a ratio in electrostatic capacity of: a region between the gate and the source electrode which sandwich therebetween only the gate insulation film to a region between the gate and the source electrode which sandwich therebetween a laminate composed of the gate insulation film and the semiconductor layer.

Also, a preferable mode is one wherein the notch portion of the source electrode is disposed inside or in a peripheral portion of the source electrode.

Also, in the foregoing, it is preferable that the gate electrode is provided with a notch portion which is disposed in a partially overlapping relationship with said semiconductor layer.

Also, in the foregoing, a preferable mode is one wherein the notch portion of the source electrode assumes a rectangular shape, a length of which shape is larger than a width of the source electrode; the notch portion of the source electrode is disposed so as to cross the source electrode.

Also, it is preferable that the semiconductor layer is formed on an upper portion of a gate bus wiring connected with the gate electrode.

Further, it is preferable that the thin film transistor has a reversed stagger construction.

Moreover, a preferable mode is one wherein a notch portion is formed in at least one of the source and the gate electrode forming the thin film transistor which is used as a switching element; and, thereby compensating for variations in parasitic capacitance appearing between the gate and the source electrode, the variations in parasitic capacitance being caused by misalignment in the mask alignment process.

With the above construction, it is possible for the device of the present invention to prevent its responsivity and its aperture ratio from lowering, and also to prevent its leakage current from increasing. Further, it is also possible for the device of the present invention to compensate for the variations in parasitic capacitance appearing between the gate and the source electrode, without being subjected to any limitation imposed by a specific construction of the thin film transistor used in the device.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes for carrying out the present invention will be described in detail using embodiments of the present invention with reference to the accompanying drawings.

First Embodiment

Figure 1:
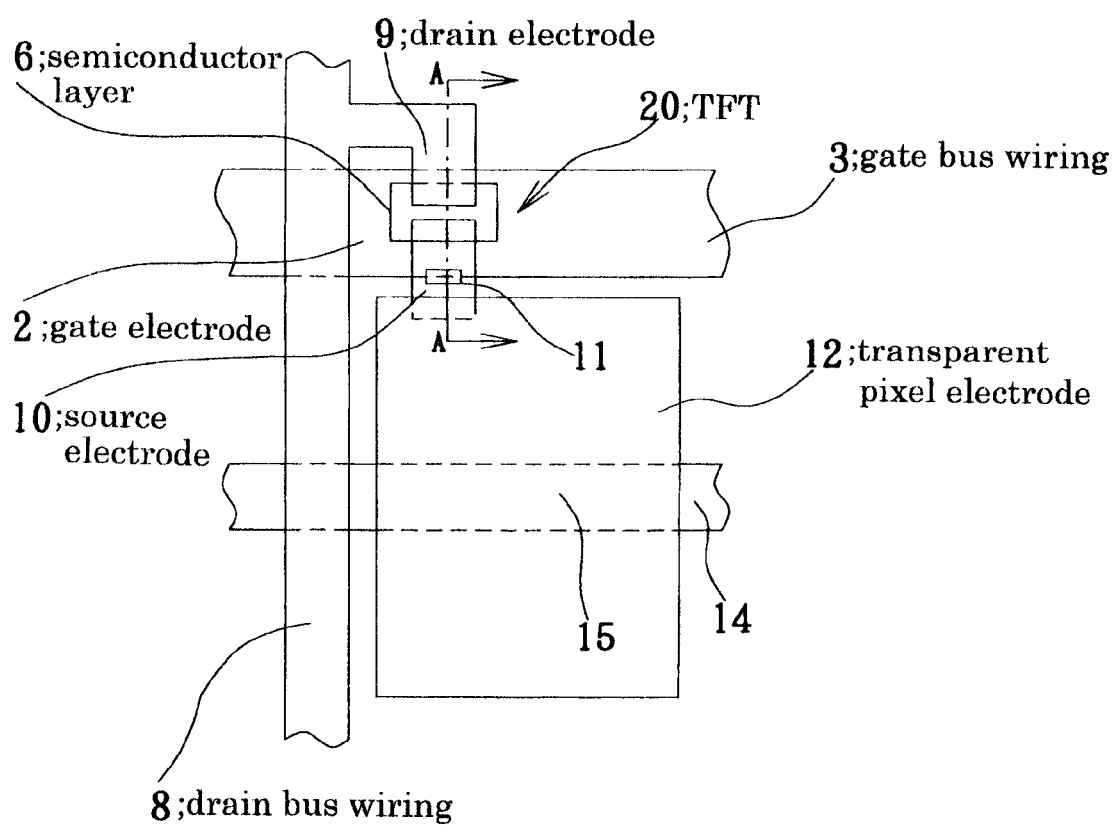
FIG. 1 is a plan view of a liquid crystal display device according to a first embodiment of the present invention.
Figure 2:
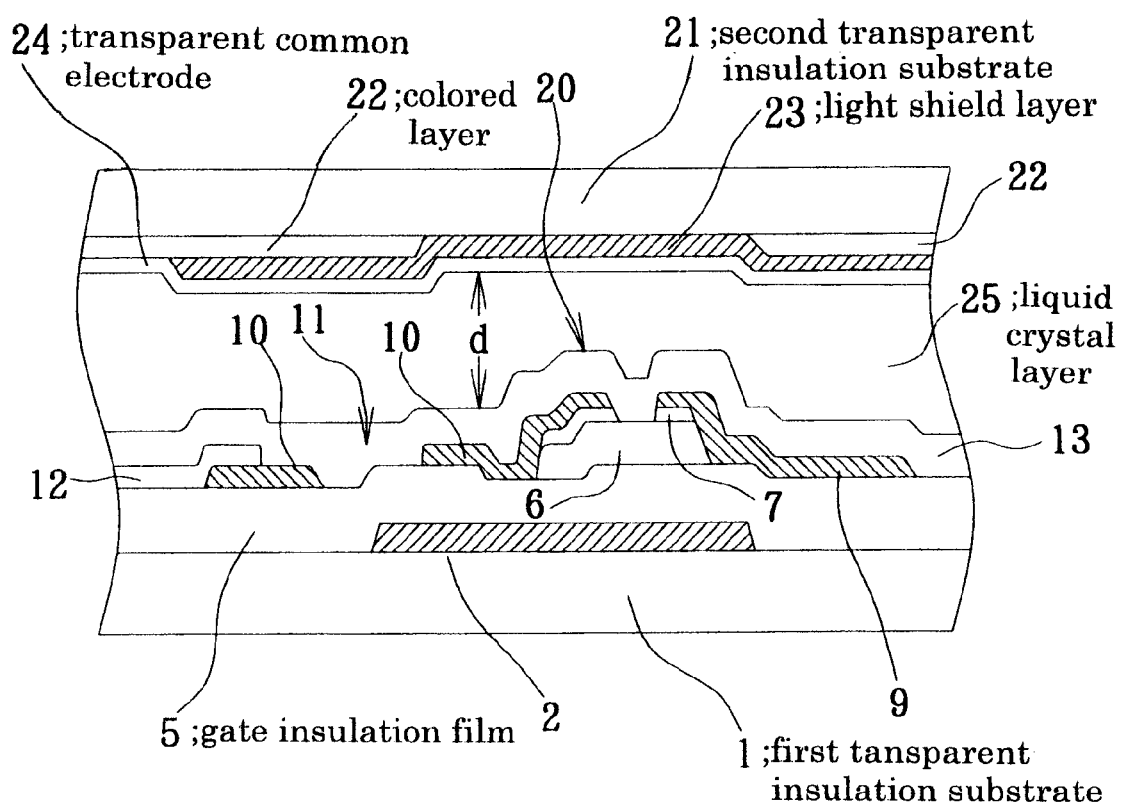
FIG. 2 is a cross-sectional view of the first embodiment of the liquid crystal display device of the present invention, taken along the line A—A of FIG. 1.
Figure 3:
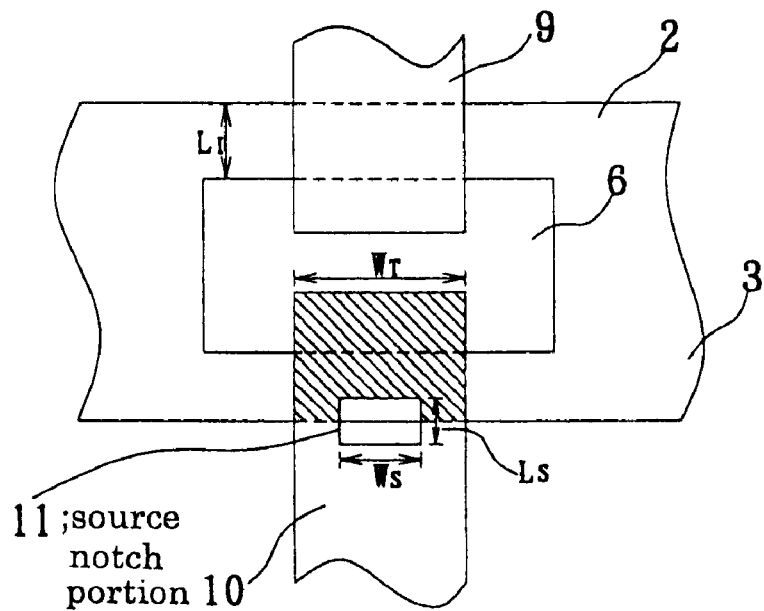
FIG. 3 is an enlarged view of an essential part of the liquid crystal display device of the present invention shown in FIG. 1.

FIGS. 1 to 3 show a liquid crystal display device of a first embodiment of the present invention.

As is clear from FIG. 2, in the liquid crystal display device of the first embodiment of the present invention, a liquid crystal layer 25 is sealed in between: a first transparent insulation substrate (i.e., active matrix type substrate) 1 made of glass and like materials on which a TFT 20 is formed; and, a second transparent insulation substrate 21 oppositely disposed from the first transparent insulation substrate 1.

Formed on the first transparent insulation substrate 1 are: a gate electrode 2 which is made of a suitable material such as chromium, molybdenum, tantalum, aluminum, and like materials, and has a film thickness of from 100 to 300 nm; and, a gate bus wiring 3 extending horizontally so as to be connected with the gate electrode 2. Each of the gate electrode 2 and the gate bus wiring 3 is formed of a metallic film which is formed over the entire surface of the first transparent insulation substrate 1 and subjected to a photo-lithography process so as to be formed into a desired pattern.

The gate electrode 2 is covered with a gate insulation film 5. This gate insulation film 5 is formed of a suitable material film such as a silicon oxide (i.e., SiO$_2$) film, silicon nitride film (i.e., Si$_3$N$_4$) and like material films, and has a film thickness of from 200 to 600 nm.

Formed over the gate bus wiring 3 is a semiconductor layer 6 which is formed of an amorphous silicon film having a film thickness of from 100 to 600 nm, and assumes a horizontally elongated shape. A contact layer 7 formed of an amorphous silicon film having a film thickness of from 30 to 100 nm is formed adjacent to each of opposite short side ends of the semiconductor layer 6.

Formed through these contact layers 7 on the opposite short side ends of the semiconductor layer 6 are a drain electrode 9 and a source electrode 10 each of which has a film thickness of from 100 to 300 and is made of a suitable material, for example such as chromium, molybdenum, tantalum, aluminum and the like. The drain electrode 9 is provided with a drain bus wiring 8. This drain bus wiring 8 assumes an elongated shape extending from the drain electrode 9 in a direction substantially perpendicular to the gate bus wiring 3. Here, as is clear from FIG. 1, both the drain electrode 9 and the source electrode 10 are disposed in a partially overlapping relationship with the gate electrode 2.

Fabrication of the drain electrode 9, drain bus wiring 8 and the source electrode 10 are realized by combination of: a thin film deposition technology represented by, for example, sputtering processes, CVD (i.e., Chemical Vapor Deposition) processes and the like; and, a photolithography technology, so that each of the drain electrode 9, drain bus wiring 8 and the source electrode 10 is formed into a desired pattern as is in the formation processes of the gate electrode 2 and the gate bus wiring 3.

The source electrode 10 is provided with a transparent pixel electrode 12. This pixel electrode 12 is formed of an indium tin oxide (herein after referred to as ITO) film and the like having a film thickness of from 10 to 100 nm. The transparent pixel electrode 12 is disposed so as to occupy the great majority of an area defined by both the gate bus wiring 3 and the drain bus wiring 8. Further, provided under the transparent pixel electrode 12 are an auxiliary capacitance wiring 14 and an auxiliary capacitance electrode 15. The TFT 20 having a reversed stagger construction is constructed of: the gate electrode 2; semiconductor layer 6; contact layer 7; drain electrode 3; and, the source electrode 10. The TFT 20 is controlled by the gate electrode 2 to form a channel region on a surface of the semiconductor layer 6 disposed over the gate electrode 2. Further, all the surfaces of the semiconductor layer 6, drain electrode 9, source electrode 10 and of the transparent pixel electrode 12 are covered by a protective film 13 which is formed of a suitable film such as a silicon oxide film, silicon nitride film and like films. Further, formed on the protective film 13 is an orientation film made of polyimide and like materials.

The TFT 20 is formed on the first transparent insulation substrate 1 to form an active matrix substrate.

On the other hand, partially formed on a surface of a second transparent insulation substrate 21, which surface faces the first transparent insulation substrate 1, are: a colored layer 22; and, a light shield layer 23 which is disposed in a region corresponding to the TFT 20. Then, a transparent common electrode 24, which is made of ITO (i.e., Indium Tin Oxide) and like materials, is formed so as to cover both the light shield layer 23 and the colored layer 22.

As is clear from an enlarged view of FIG. 3, a source notch portion 11 assuming a rectangular shape is formed inside the source electrode 10, and disposed in a partially overlapping relationship with the gate electrode 2. In the above, the source notch portion 11 satisfies the following equation (2): namely, $$W_S : W_T \approx C_{IS} : C_I \tag{2}$$

Where:

$W_S$ is a length of the source notch portion 11;

$W_T$ is a width of the source electrode 10;

$C_{IS}$ is a capacitance between the gate and the source electrode per unit area, provided that only the gate insulation film 5 is interposed between the gate and the source electrode; and, $C_I$ is a capacitance between the gate and the source electrode per unit area, provided that a laminated film composed of the gate insulation film 5 and the semiconductor layer 6 is interposed between the gate and the source electrode.

In other words, a ratio of the width $W_T$ of the source electrode 10 is determined so as to be substantially equal to a ratio of: the capacitance $C_{IS}$ between the gate and the source electrode per unit area, provided that only the gate insulation film 5 is interposed between the gate and the source electrode; to the capacitance $C_I$ between the gate and the source electrode per unit area, provided that the laminated film composed of the gate insulation film 5 and the semiconductor layer 6 is interposed between the gate and the source electrode.

By forming the source notch portion 11 so as to satisfy the above equation (2), it is possible to compensate for the variations in parasitic capacitance $C_{GS}$ appearing between the gate and the source electrode, which variations are caused by misalignment of the mask.

For example, in the case that the gate insulation film 5 is formed of a silicon nitride film having a film thickness of approximately 400 nm (dielectric constant: approximately 6.5) while the semiconductor layer 6 is formed of an amorphous silicon film having a film thickness of approximately 400 nm (dielectric constant of which is approximately 12), the capacitance $C_{IS}$ and $C_I$ are expressed by the following equations:

$$C_{IS} \approx 0.93 \times 10^{-4} \text{ pF}/\mu m^2$$

$$C_I \approx 1.44 \times 10^{-4} \text{ pF}/\mu m^2$$

As result, when a value of the width $W_T$ of the source electrode 10 is set at approximately 20 μm, a value of the corresponding length $W_S$ of the source notch portion 11 is determined using the above equation (2) so as to be approximately 12.9 μm.

As for a width Ls of the source notch portion 11, a sufficient value of this width Ls in setting is approximately 4 μm, provided that: as shown in FIG. 3, the source notch portion 11 has its width of approximately 4 μm divided into two halves each of approximately 2 μm by a longitudinal contour line of the gate electrode 2.

In order to restrict the amount of light which is incident from the first transparent insulation substrate 1, reflected from the light shield layer 23 and incident on the semiconductor layer 6, a distance $L_I$ between: a contour line of the gate electrode 2 serving as a light shield means; and, a contour line of the semiconductor layer 6, is set at a value equal to or more than approximately 4 μm. Further, the above distance $L_I$ is set so as to be equal to or more than a distance "d" between the first transparent insulation substrate 1 (more particularly, a surface of the protective film 13) and the second transparent insulation substrate 21 (more particularly, a surface of the transparent common electrode 24).

As described above, in this embodiment of the present invention having the above construction, the TFT 20 is formed on the first transparent insulation substrate 1, and constructed of: the semiconductor layer 6 formed adjacent to the gate insulation film 5; both the drain electrode 9 and the source electrode 10 formed in the opposite end portions of this semiconductor layer 6; and, the gate electrode 2 formed in the gate insulation film 5 in a partially overlapping relationship with both the drain electrode 9 and the source electrode 10.

In this TFT 20, as shown in FIG. 3, the source notch portion 11 satisfying the above equation (2) is formed inside the source electrode 10 to enable the TFT 20 to compensate for the variations in parasitic capacitance $C_{GS}$ which appears between the gate and the source electrode. Consequently, it is possible for the liquid crystal display device of the present invention to compensate for the variations of the parasitic capacitance $C_{GS}$ appearing between the gate and the source electrode, which variations are caused by misalignment of the mask.

Also, in the liquid crystal display device of the present invention, since any additional pattern which serves as the gate electrode 2 or the source electrode 10 and is for use in compensation is not required, it is possible to prevent the liquid crystal display device of the present invention from being impaired in responsivity and in aperture ratio.

Further, the liquid crystal display device of the present invention has a construction capable of restricting the amount of light incident on the semiconductor layer 6. Consequently, it is possible for the device of the present invention to prevent its leakage current from increasing.

Still further, in the device of the present invention, since the semiconductor layer 6 assumes a horizontally elongated shape and is disposed over the gate bus wiring 3 along the length of the wiring 3. It is possible to form the TFT 20 into a TFT having a transversal type construction, which prevents the present invention from being limited in application to a TFT having a specific construction.

Second Embodiment

Figure 4:
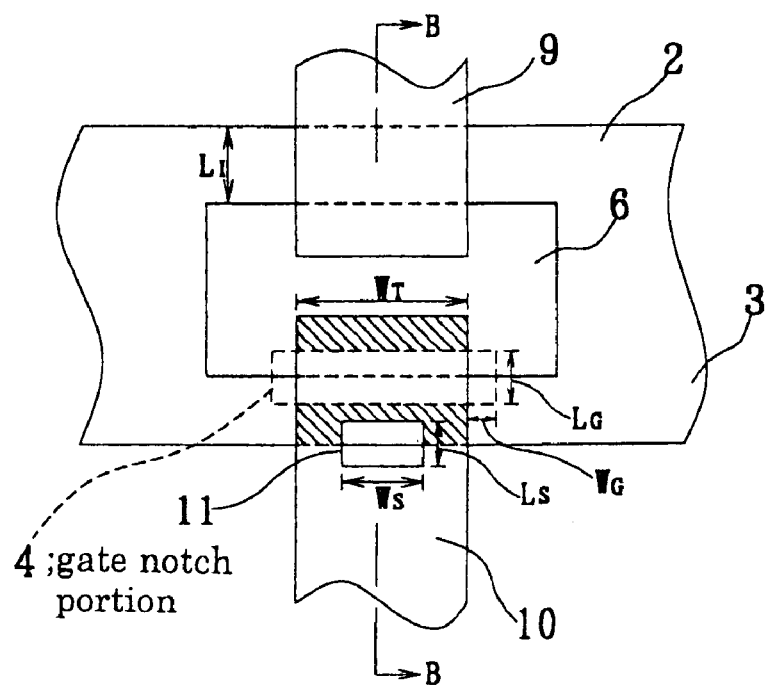
FIG. 4 is a plan view of the liquid crystal display device according to a second embodiment of the present invention.
Figure 5:
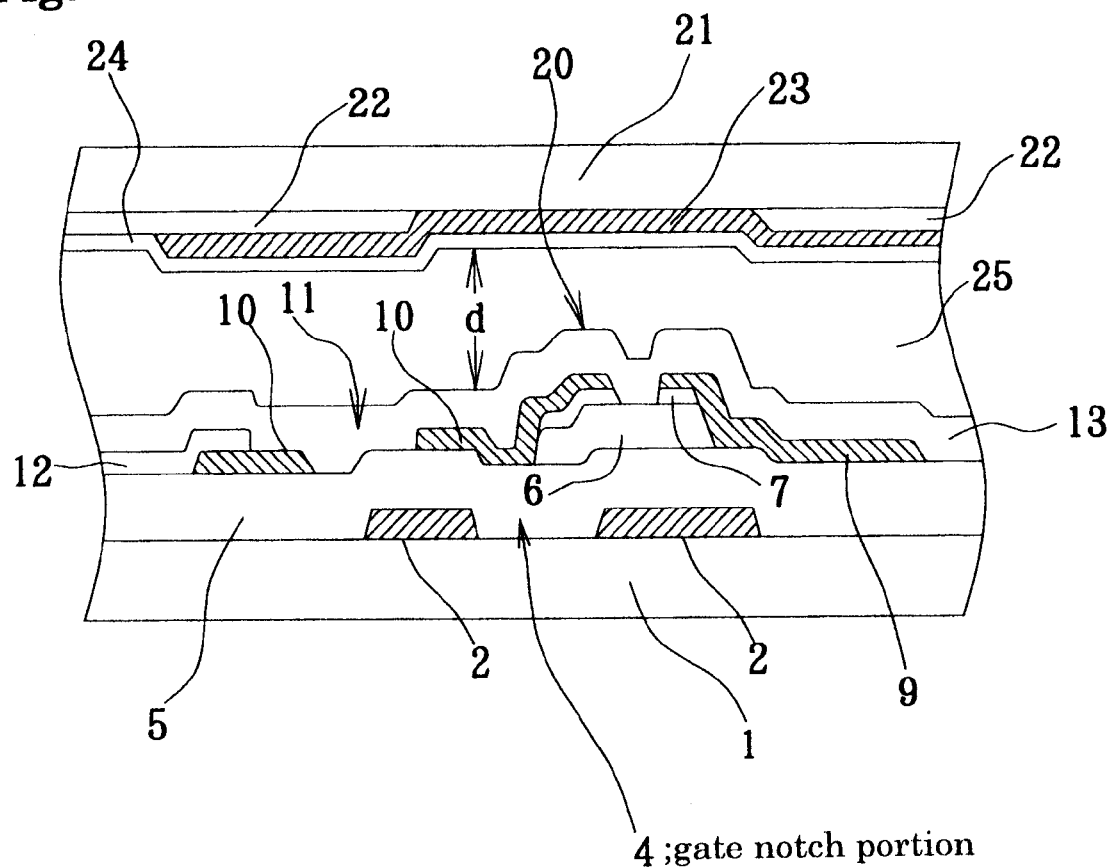
FIG. 5 is a cross-sectional view of the second embodiment of the liquid crystal display device of the present invention, taken along the line B—B of FIG. 4.

FIG. 4 shows a plan view of a second embodiment of the liquid crystal display device of the present invention. FIG. 5 shows a cross-sectional view of the liquid crystal display device of the present invention, taken along the line B—B of FIG. 4.

This second embodiment of the liquid crystal display device of the present invention differs significantly from the above first embodiment of the present invention in that it is provided with a gate notch portion 4 in addition to the source notch portion 11.

More specifically, as shown in FIGS. 4 and 5, the gate notch portion 4 provided inside the gate electrode 2 assumes a rectangular shape striding over a part of the semiconductor layer 6. Here, a longitudinal length of this gate notch portion 4 is larger than a width $W_T$ of the source electrode 10. The gate notch portion 4 is formed so as to cross the source electrode 10 in a direction parallel to a longitudinal direction of the gate bus wiring 3.

Further, as shown in FIG. 4, a length $W_G$ of a part of the gate notch portion 4, which part extends outward from a contour line of the source electrode 10, is set at a length of approximately 2 μm with a sufficient margin of safety in view of the fact that an accuracy of mask alignment is approximately 1 μm. Similarly, as for a width $L_G$ of the gate notch portion 4, a sufficient value of this width $L_G$ in setting is approximately 4 μm, provided that: as shown in FIG. 4, the gate notch portion 4 has its width $L_G$ of approximately 4 μm divided into two halves each of approximately 2 μm by a longitudinal lower contour line of the semiconductor layer 6. Since the second embodiment of the present invention has the above construction, it is possible for the second embodiment of the present invention to compensate for the variations in parasitic capacitance appearing between the gate and the source electrode, as is in the case of the first embodiment of the present invention, wherein the variations in the parasitic capacitance are caused by misalignment in the mask alignment process.

As for the remaining construction other than the above construction, there is substantially no difference between the second and the first embodiment of the present invention. Consequently, in FIGS. 4 and 5, the parts which are the same as ones in FIGS. 1 to 3 have been given the same reference numerals, and, therefore not explained hereinafter.

As described above, also in this second embodiment of the present invention having the above construction, it is possible to obtain substantially the same effect as that obtained in the first embodiment of the present invention.

In addition, in this second embodiment of the present invention, such additional provision of the gate notch portion 4 may further improve an accuracy of compensation for the variations in parasitic capacitance appearing between the gate and the source electrode, in comparison with the first embodiment of the present invention.

Third Embodiment

Figure 6:
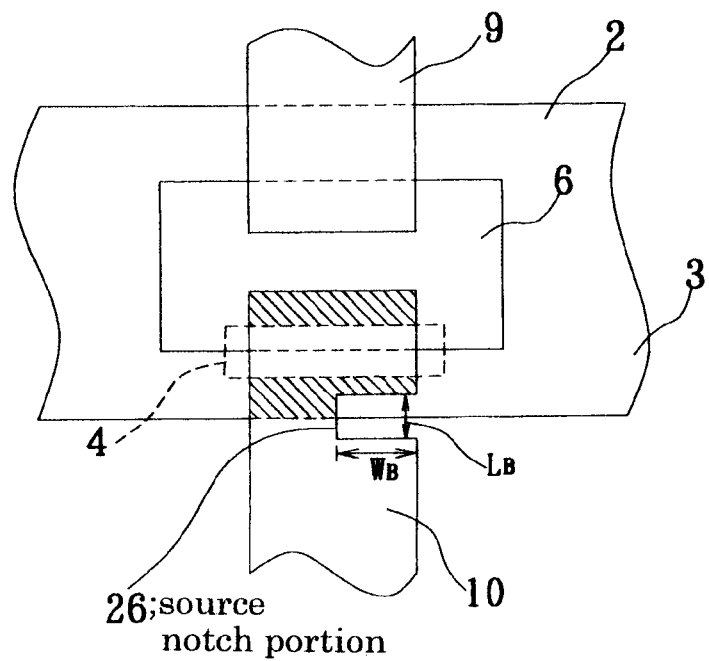
FIG. 6 is a plan view of the liquid crystal display device according to a third embodiment of the present invention.
Figure 7:
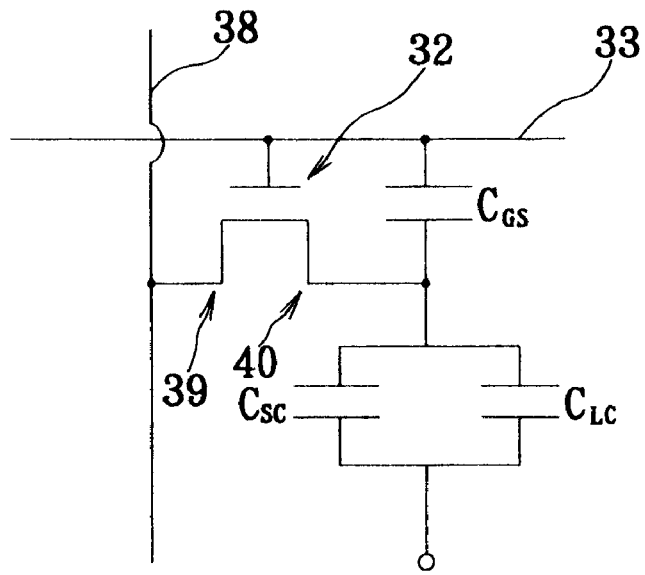
FIG. 7 is a circuit diagram equivalent in function to one of the pixels of the liquid crystal display device of the present invention.
Figure 8:
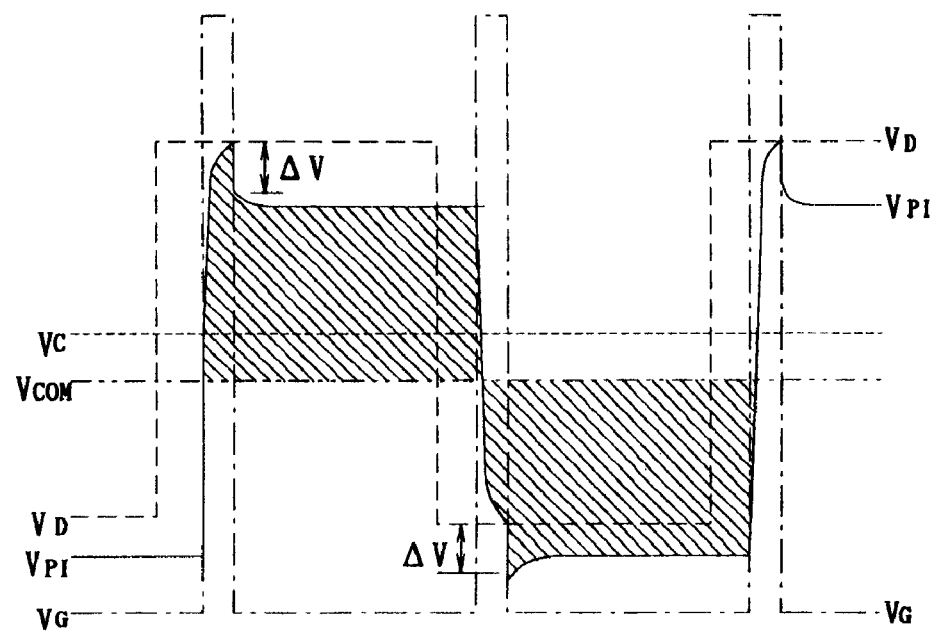
FIG. 8 is a timing chart of various electric signals in drive mode of the liquid crystal display device of the present invention.
Figure 9:
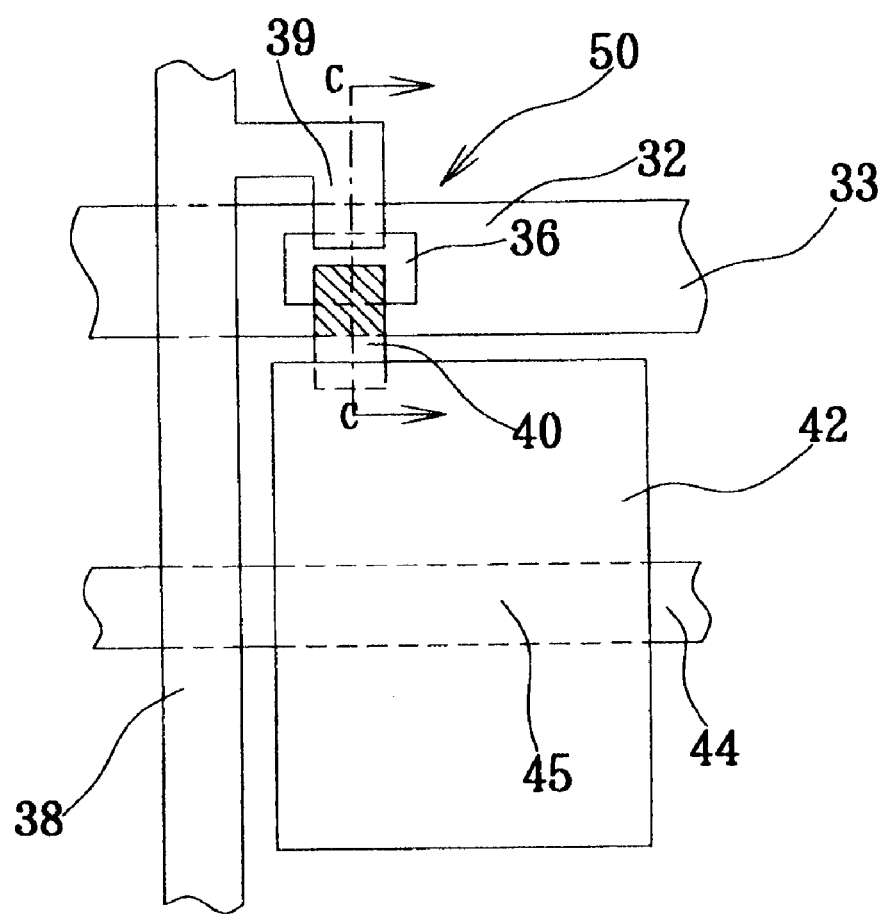
FIG. 9 is a plan view of a conventional liquid crystal display device of active matrix type having a reversed stagger construction.
Figure 10:
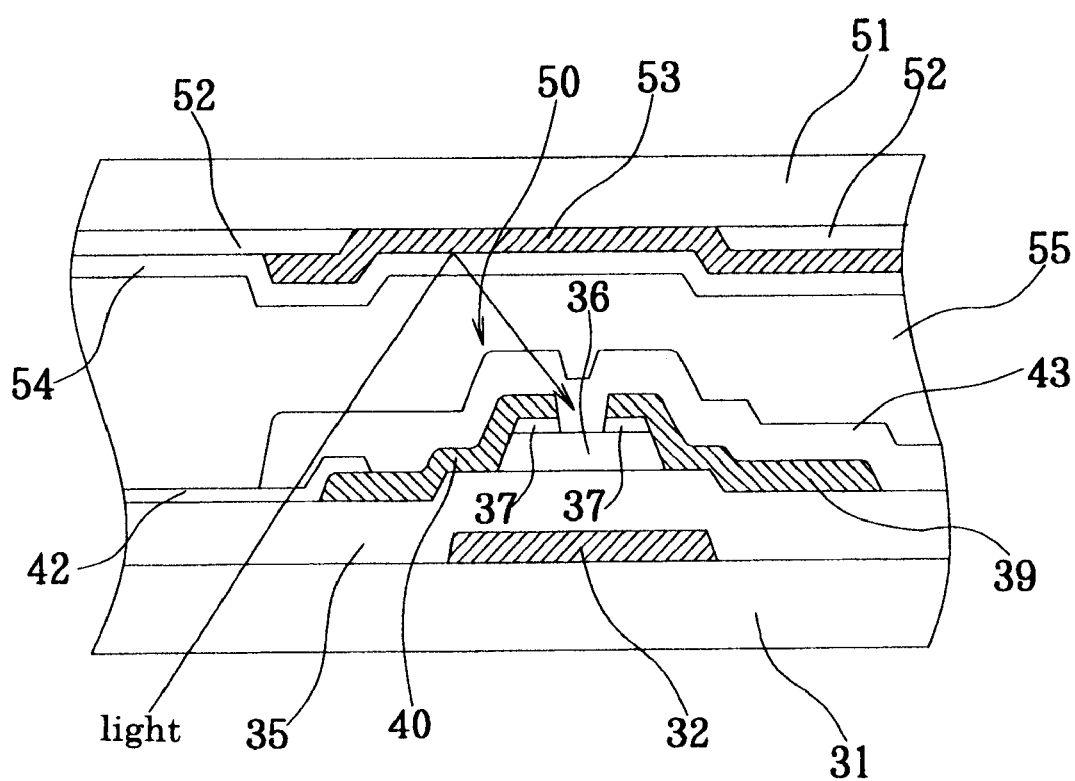
FIG. 10 is a cross-sectional view of the conventional liquid crystal display device, taken along the line C—C of FIG. 9.
Figure 11:
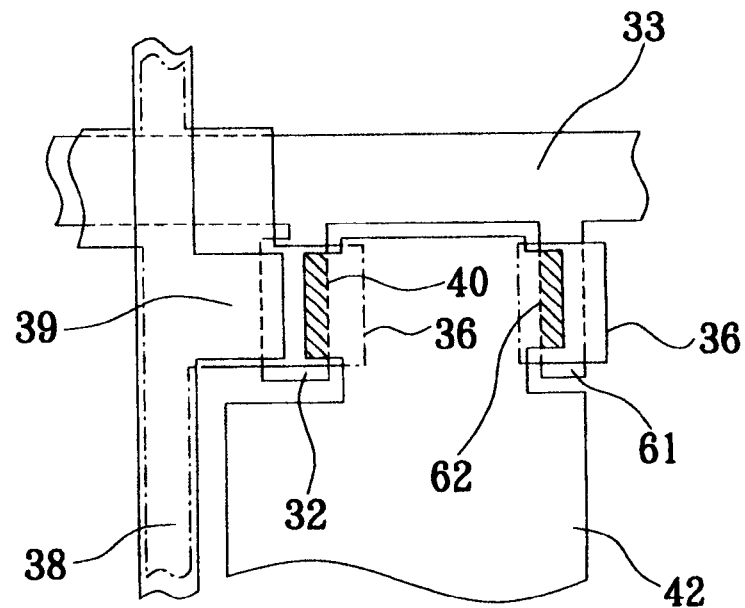
FIG. 11 is a plan view of a conventional liquid crystal display device, illustrating a compensating source electrode disposed over both the source electrode and the compensating gate electrode in a partially overlapping relationship therewith.
Figure 12:
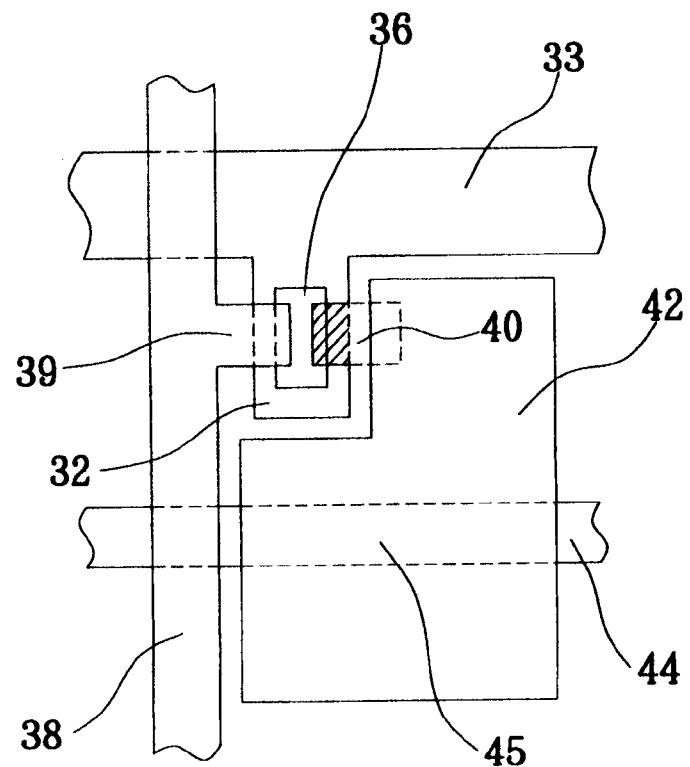
FIG. 12 is a plan view of a conventional liquid crystal display device.
Figure 13:
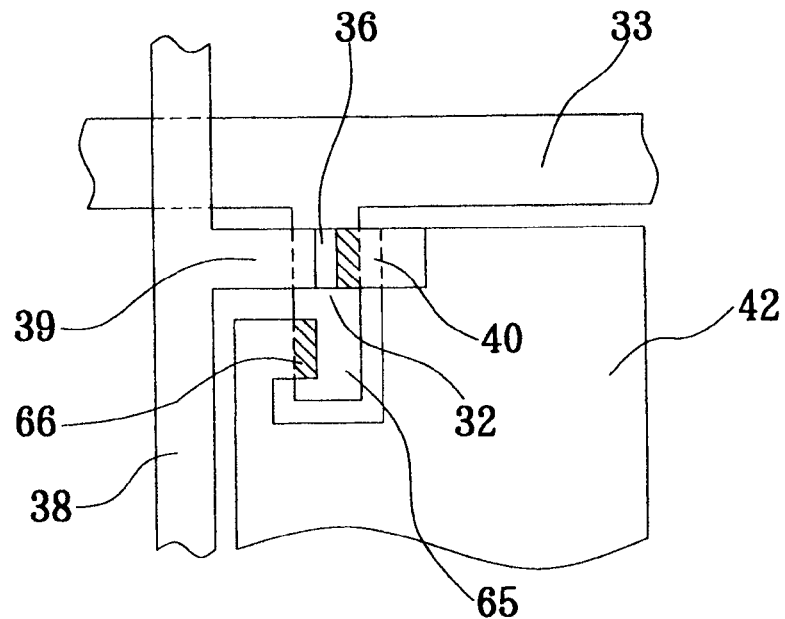
FIG. 13 is a plan view of a conventional liquid crystal display device, illustrating a compensating source electrode formed so as to be turned towards the left side portion of the compensating gate electrode, and thereby partially overlapping with the compensating gate electrode.
Figure 14:
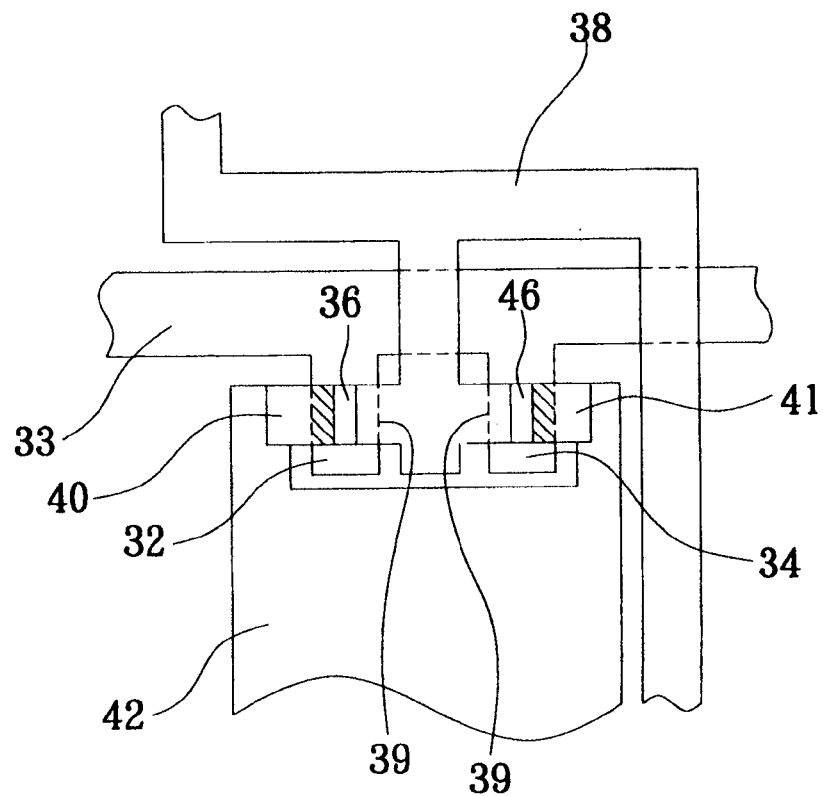
FIG. 14 is a plan view of a conventional liquid crystal display device, illustrating a pair of source electrodes disposed outside the gate electrodes in a partially overlapping relationship therewith.
Figure 15:
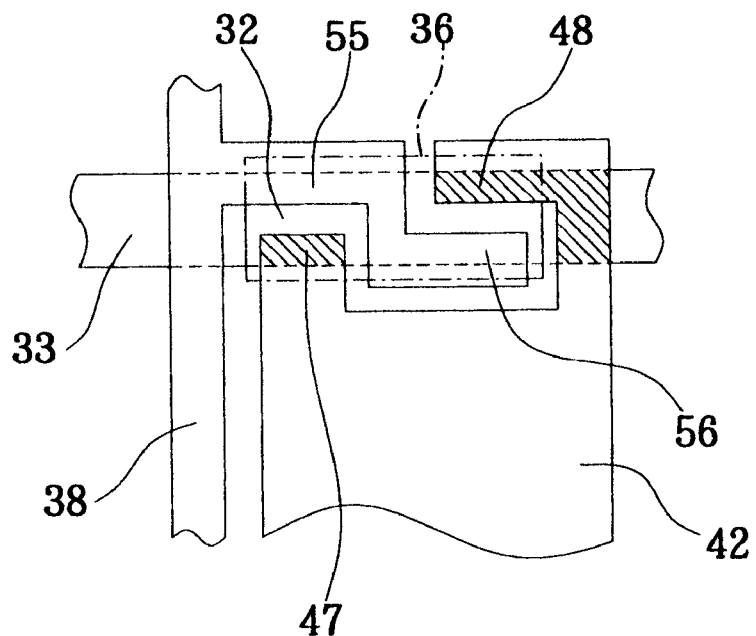
FIG. 15 is a plan view of a conventional liquid crystal display device, illustrating the source electrode oppositely disposed from the second electrode so as to partially overlap with an upper portion of the gate bus wiring.
Figure 16:
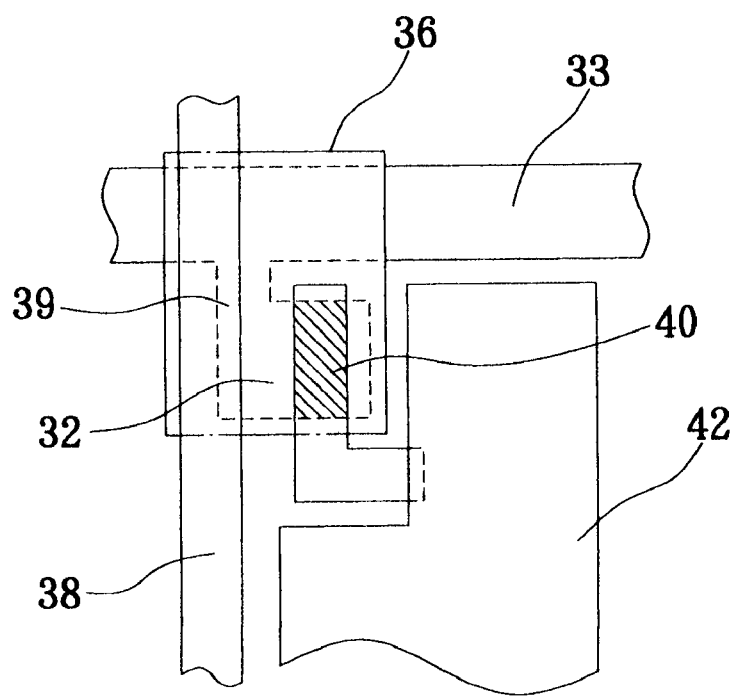
FIG. 16 is a plan view of a conventional liquid crystal display device, illustrating a source electrode 40 formed in each of opposite ends of the semiconductor layer through a contact layer.

FIG. 6 shows a plan view of the liquid crystal display device of a third embodiment of the present invention, illustrating a schematic construction of the device.

This third embodiment of the liquid crystal display device of the present invention differs significantly from the above second embodiment of the present invention in that: as shown in FIG. 6, it has a source notch portion 26 formed in its edge portion. In other words, in the third embodiment of the present invention, as shown in FIG. 6, the source notch portion 26 is formed in the edge portion of the source electrode 10 so as to stride over a part of the gate electrode 2. Here, a longitudinal length $W_B$ of this source notch portion 26 is substantially equal to the length $W_S$ of the source notch portion 11 of the second embodiment of the present invention shown in FIG. 4, as follows: namely, $W_B \approx W_S$. Similarly, as for the width $L_B$ of the source notch portion 26, a length of this width $L_B$ is set so as to be substantially equal to that of the width $L_S$ of the source notch portion 11 of the second embodiment of the present invention shown in FIG. 4, as follows: namely, $L_B \approx L_S$. As for the gate notch portion 4, the same setting as that applied to the second embodiment of the present invention shown in FIG. 4 is also applied to the third embodiment of the present invention shown in FIG. 6. Since the third embodiment of the present invention has the above construction, it is possible for the third embodiment of the present invention to compensate for the variations in parasitic capacitance appearing between the gate and the source electrode, as is in the case of the second embodiment of the present invention, wherein the variations in the parasitic capacitance are caused by the presence of misalignment occurring in the mask alignment process.

As described above, also in this third embodiment of the present invention having the above construction shown in FIG. 6, it is possible to obtain substantially the same effect as that of the second embodiment of the present invention shown in FIG. 4.

In addition, in this third embodiment of the present invention, since the source notch portion 26 is formed in the edge portion of the source electrode 10, the third embodiment of the present invention is facilitated in its patterning processes in comparison with the case that the source notch portion 26 is formed inside the source electrode 10. Due to the above construction, third embodiment of the present invention is substantially free from any breakage in electric connection and like disadvantages.

Although the various embodiments of the present invention have been described above with reference to the drawings, the present invention is not limited in concrete construction to these embodiments only.

For example, in the above description of the embodiments of the present invention, though compensation for the variations in parasitic capacitance appearing between the gate and the source electrode has been described, it is also possible in a similar manner to apply the present invention to the case of compensation for variations in parasitic capacitance appearing between the gate and the drain electrode, because the source electrode has substantially the same function as that of the drain electrode in principle.

Further, in the above embodiments of the present invention, though the TFT having the reversed stagger construction has been described, it is also possible to apply the present invention to a TFT of a reversed stagger type in which the channel region is formed under the gate electrode.

Further, in the liquid crystal display device of the present invention, it is also possible to form the transparent common electrode on the first transparent insulation substrate in place of the second transparent insulation substrate.

Further, as such a protective film described above, it is also possible to use an insulation film made of a suitable material, for example such as BSG (i.e., Bron Silicate Glass), PSG (i.e., phospho-Silicate Glass), BPSG (i.e., Boro-Phospho Silicate Glass) and like materials.

Further, in the above embodiments of the present invention, the film thickness of each of the insulation and the conductive films may vary according to purposes, applications and the like. This is true as to the size of each of the source and the gate notch portion of the above embodiments of the present invention.

It is thus apparent that the present invention may be changed and modified without departing from the scope and spirit of the invention.

Finally, the present application claims the Convention Priority based on Japanese Patent Application No. Hei10-162691 filed on Jun. 10, 1998, which is herein incorporated by reference.

What is claimed is:

1. In a liquid crystal display device comprising:
  a first transparent insulation substrate on which a plurality of thin film transistors are formed; a second transparent insulation substrate; and, a liquid crystal layer sealed in a space between said first and said second transparent insulation substrate, wherein each of said thin film transistors is provided with: a semiconductor layer formed adjacent to a gate insulation film; a drain and a source electrode both formed in opposite ends of said semiconductor layer; and, a gate electrode formed in said gate insulation film so as to be disposed in a partially overlapping relationship with both said drain and said source electrode, the improvement wherein:
  said source electrode is provided with an opening portion which is disposed in a partially overlapping relationship with said gate electrode.

2. The liquid crystal display device according to claim 1, wherein said opening portion assumes a rectangular shape having a predetermined length;
  a ratio in length of said predetermined length of said rectangular shape of said opening portion in said source electrode to a width of said source electrode is substantially equal to a ratio in electrostatic capacity of: a region between said gate and said source electrode which sandwich therebetween only said gate insulation film to a region between said gate and said source electrode which sandwich therebetween a laminate composed of said gate insulation film and said semiconductor layer.

3. The liquid crystal display device according to claim 1, wherein said opening portion of said source electrode is disposed inside or in a peripheral portion of said source electrode.

4. The liquid crystal display device according to claim 2, wherein said opening portion of said source electrode is disposed inside or in a peripheral portion of said source electrode.

5. The liquid crystal display device according to claim 1, wherein said gate electrode is provided with an opening portion which is disposed in a partially overlapping relationship with said semiconductor layer.

6. The liquid crystal display device according to claim 2, wherein said gate electrode is provided with an opening portion which is disposed in a partially overlapping relationship with said semiconductor layer.

7. The liquid crystal display device according to claim 3, wherein said gate electrode is provided with an opening portion which is disposed in a partially overlapping relationship with said semiconductor layer.

8. The Liquid crystal display device according to claim 5, wherein said opening portion of said gate electrode assumes a rectangular shape, a length of which is larger than a width of said source electrode; and said opening portion of said gate electrode is disposed so as to cross said source electrode.

9. The Liquid crystal display device according to claim 6, wherein said opening portion of said gate electrode assumes a rectangular shape, a length of which is larger than a width of said source electrode; and said opening portion of said gate electrode is disposed so as to cross said source electrode.

10. The Liquid crystal display device according to claim 7, wherein said opening portion of said gate electrode assumes a rectangular shape, a length of which is larger than a width of said source electrode; and said opening portion of said gate electrode is disposed so as to cross said source electrode.

11. The liquid crystal display device according to claim 1, wherein said semiconductor layer is formed over a gate bus wiring connected with said gate electrode.

12. The liquid crystal display device according to claim 2, wherein said semiconductor layer is formed over a gate bus wiring connected with said gate electrode.

13. The liquid crystal display device according to claim 3, wherein said semiconductor layer is formed over a gate bus wiring connected with said gate electrode.

14. The liquid crystal display device according to claim 4, wherein said semiconductor layer is formed over a gate bus wiring connected with said gate electrode.

15. The liquid crystal display device according to claim 5, wherein said semiconductor layer is formed over a gate bus wiring connected with said gate electrode.

16. The liquid crystal display device according to claim 1, wherein said thin film transistor has a reversed stagger construction.

17. The liquid crystal display device according to claim 2, wherein said thin film transistor has a reversed stagger construction.

18. The liquid crystal display device according to claim 3, wherein said thin film transistor has a reversed stagger construction.

19. The liquid crystal display device according to claim 4, wherein said thin film transistor has a reversed stagger construction.

20. The liquid crystal display device according to claim 5, wherein said thin film transistor has a reversed stagger construction.

21. The liquid crystal display device according to claim 6, wherein said thin film transistor has a reversed stagger construction.

* * * * *

UNITED STATES PATENT AND TRADEMARK OFFICE
CERTIFICATE OF CORRECTION

PATENT NO. : 6,310,668 B1
DATED : October 30, 2001
INVENTOR(S) : T. Ukita

It is certified that error appears in the above-identified patent and that said Letters Patent is hereby corrected as shown below:

Column 2,
Line 46, "V" should read -- $V_{P1}$ --
Line 47, "of" should not begin new paragraph.

Column 10,
Line 44, "≈" should read -- ≒ --

Column 11,
Lines 15 and 16, "≈" should read -- ≒ --

Column 13,
Lines 16 and 20, "≈" should read -- ≒ --

Signed and Sealed this

Eighteenth Day of June, 2002

Attest:

Attesting Officer

JAMES E. ROGAN
Director of the United States Patent and Trademark Office